(12) United States Patent
Goeke et al.

(10) Patent No.: US 10,480,585 B2
(45) Date of Patent: Nov. 19, 2019

(54) REDUNDANT COUPLING ARRANGEMENTS

(71) Applicant: Goodrich Corporation, Charlotte, NC (US)

(72) Inventors: Jerry L. Goeke, Vernon Center, NY (US); Brayton Reed, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 38 days.

(21) Appl. No.: 15/336,420

(22) Filed: Oct. 27, 2016

(65) Prior Publication Data

US 2018/0119743 A1    May 3, 2018

(51) Int. Cl.
F16D 3/79    (2006.01)
F16D 3/18    (2006.01)

(52) U.S. Cl.
CPC .............. *F16D 3/185* (2013.01); *F16D 3/79* (2013.01)

(58) Field of Classification Search
CPC .................................. F16D 3/79; F16D 3/185
USPC ....................... 464/79, 80, 99, 151
See application file for complete search history.

(56) References Cited

U.S. PATENT DOCUMENTS

| | | | |
|---|---|---|---|
| 1,658,750 A * | 2/1928 | Weiland | F16D 3/74 464/80 X |
| 1,871,227 A * | 8/1932 | Smith | F16D 3/72 464/79 |
| 2,171,999 A * | 9/1939 | Weiland | F16D 3/74 464/80 X |
| 2,682,760 A | 7/1954 | Shenk | |
| 2,883,839 A | 4/1959 | Troeger et al. | |
| 3,346,945 A * | 10/1967 | Chalpin | F16D 3/72 464/79 |
| 4,133,188 A | 1/1979 | Cartwright | |
| 4,276,758 A | 7/1981 | Coman et al. | |
| 4,457,734 A | 7/1984 | Cohen | |
| 5,007,880 A | 4/1991 | Walker | |
| 5,364,309 A | 11/1994 | Heidrich et al. | |
| 5,407,386 A | 4/1995 | Kish et al. | |
| 5,588,917 A | 12/1996 | D'Ercole | |
| 8,591,345 B2 | 11/2013 | Stocco et al. | |
| 2007/0049379 A1 | 3/2007 | Faass et al. | |
| 2015/0051003 A1 | 2/2015 | Julian | |

FOREIGN PATENT DOCUMENTS

DE    660 305    *    5/1938    ...................... 464/80

OTHER PUBLICATIONS

Extended European Search Report for European Patent Application No. 17197857.0, dated Apr. 3, 2018.

* cited by examiner

*Primary Examiner* — Greg Binda
(74) *Attorney, Agent, or Firm* — Locke Lord LLP; Scott D. Wofsy; Georgi Korobanov

(57) ABSTRACT

A flexible diaphragm coupling that includes a primary torque path and a secondary torque path. The secondary torque path includes a crowned or spherical spline assembly and provides additional capability during transient over-torque of the primary torque path or acts as the primary torque path in the unlikely event of diaphragm failure.

11 Claims, 5 Drawing Sheets

REDUNDANT COUPLING ARRANGEMENTS

BACKGROUND OF THE INVENTION

1. Field of the Invention

The present disclosure relates to flexible couplings, and more particularly to flexible couplings with redundant load paths.

2. Description of Related Art

Flexible couplings are commonly used to transmit torque while accommodating axial and/or angular misalignment between driving and driven shaft. Some flexible couplings use one or more contoured diaphragms welded or otherwise secured together to form a flexible section, which is rotatably supported for transferring torque between the driving and driven shafts. The diaphragms are typically configured to accommodate shaft misalignments while transferring torque without over-stressing the material forming the diaphragms, typically by varying the diaphragm profile. The profile ensures that stress within the diaphragm remains below the yield strength of the diaphragm material while allowing diaphragm bending to accommodate misalignment.

Flexible diaphragms have successfully provided a highly reliable method of transmitting torque along load paths. However, in some applications it can be necessary to transfer torque between driving and driven shafts with redundancy. The redundancy enables the flexible coupling to continue to transfer torque between the driving and driven shafts in the event that the torque applied by the driving shaft to the diaphragms exceeds the torque-carrying capability of the flexible diaphragms.

Such conventional methods and systems have generally been considered satisfactory for their intended purpose. However, there is still a need in the art for improved flexible couplings. The present disclosure provides a solution for this need.

SUMMARY OF THE INVENTION

A redundant coupling arrangement includes a first member defining a first axis, a second member defining a second axis and in operable communication with the first member, and first and second torque transmitting arrangements. The first torque transmitting arrangement is configured to transfer torque between the first and second members while allowing at least one of axial displacement between the members and angular misalignment between the first and second axes. The second torque transmitting arrangement is configured to transfer torque between the members while allowing at least one of axial displacement between the members and angular misalignment between the first and second axes.

In certain embodiments, the first and second torque transmitting arrangements can allow both axial displacement between the first and second members and angular misalignment of the first axis relative to the second axis. The second torque transmitting arrangement can be positioned radially inward of the first torque transmitting arrangement. The second torque transmitting arrangement can be configured to supply no torque between the first and second members unless the first torque transmitting arrangement has failed. Parts of the second torque transmitting arrangement that transmit torque can make no contact unless the first torque transmitting arrangement has failed.

In accordance with certain embodiments, the first torque transmitting arrangement can include a flexible diaphragm section. The flexible diaphragm section can include a pair of axially adjacent diaphragm members. The axially adjacent diaphragm members can be coupled to one another at their outer rim portions. The axially adjacent diaphragm members can be coupled to one another at their inner rim portions. The second torque transmitting arrangement can be disposed within an interior of the first torque transmitting arrangement.

It is also contemplated that, in accordance with certain embodiments, the second torque transmitting arrangement can include a spherical body and a collar. The spherical body can be arranged within the collar. The collar can be fixed in rotation relative to one of the first and second members. The spherical body can be fixed in rotation relative to the other of the first and second members. A plurality of internal splines defined within an inner surface of the collar. The internal splines can oppose the spherical body. The internal splines can have lateral faces that are substantially planar. A plurality of external splines can be disposed on an outer surface of the spherical body. The external splines can have a crown. The external splines can be spherical splines. The external splines can have a spherical drive surface. Each of the external splines can be received within an internal spline.

In further contemplated embodiments, the external splines can have first and second positions relative to the internal splines. In the first position, the external splines can be separated from the internal spline such that no torque is communicated through the second torque transmitting arrangement. In the second position, the external splines can contact the internal splines such that torque is communicated through the second torque transmitting arrangement.

A system includes a redundant arrangement as described above, a driving member connected to the first member of the redundant coupling arrangement, and a driven member connected to the second member of the redundant coupling arrangement. When the external splines are in the first position, a load path extending through the redundant coupling arrangement includes the first torque transmitting arrangement and excludes the second torque transmitting arrangement. When the external splines are in the second position, the load path includes the second torque transmitting arrangement. In certain embodiments, when the external splines are in the second position, the load path can exclude the first torque transmitting arrangement. In accordance with certain embodiments, when the external splines are in the second position, the load path can include both the first and second torque transmitting arrangements.

A method of redundantly communicating torque through a coupling includes receiving torque at a first member defining a first axis. The torque is communicated to a second member defining a second axis and which is operably connected to the first member by first and second torque transmitting arrangements. The first and second torque transmitting arrangements allow at least one of axial displacement between the first and second members and angular displacement of the first axis relative to the second axis.

In certain embodiments, the torque can be transmitted through the first torque transmitting arrangement and not the second torque transmitting arrangement. Torque can be transmitted through the second torque transmitting arrangement and not the first torque transmitting arrangement. Torque can be initially transmitted through the first torque transmitting arrangement and not through the second torque transmitting arrangement, and thereafter transmitted through the second torque transmitting arrangement and not the first torque transmitting arrangement.

In accordance with certain embodiments, torque can be transmitted according to three operating modes. In a first operating mode all torque is transmitted through the first torque transmitting arrangement and there is zero contact in the second torque transmitting arrangement. In a second operating mode all torque is transmitted through the second torque transmitting arrangement in case of failure of the first torque transmitting arrangement. In a third operating mode, torque is split between the first torque transmitting arrangement and the second torque transmitting arrangement, the first torque transmitting arrangement being the primary torque transmission mechanism and the second torque transmitting arrangement providing overload protection by engaging (via contact) after a predetermined amount of torque has been applied to the redundant coupling arrangement.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
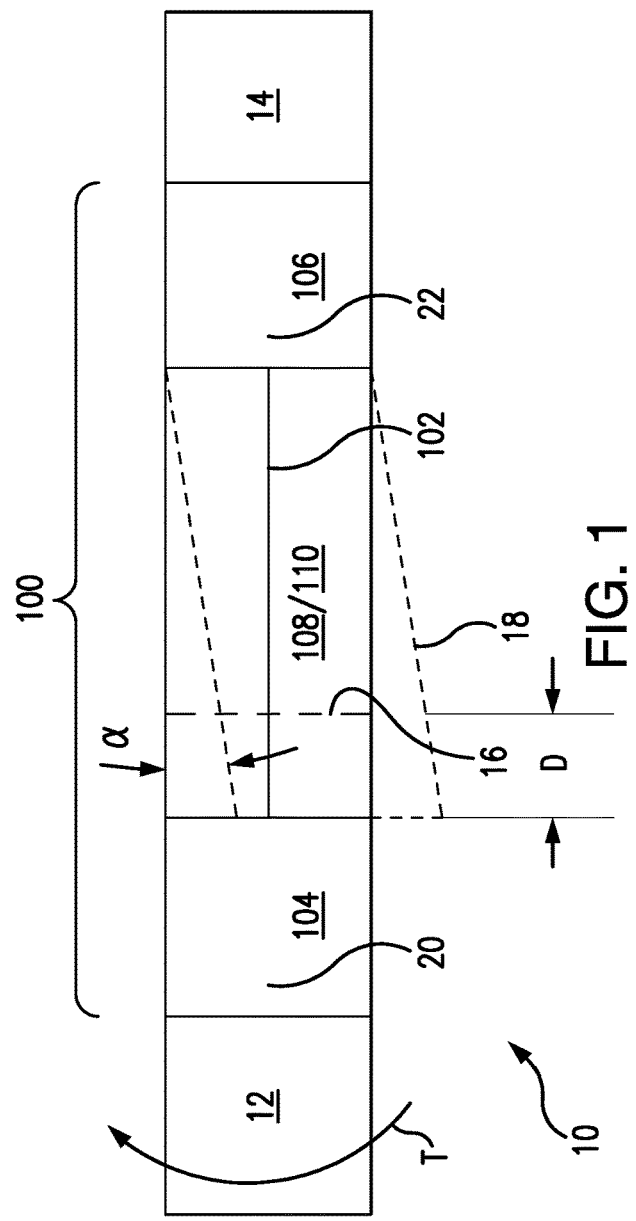
FIG. 1 is a schematic view of an exemplary embodiment of a system constructed in accordance with the present disclosure, showing a redundant coupling arrangement communicating torque while accommodating misalignment.

Reference will now be made to the drawings wherein like reference numerals identify similar structural features or aspects of the subject disclosure. For purposes of explanation and illustration, and not limitation, a partial view of an exemplary embodiment of a redundant coupling arrangement in accordance with the disclosure is shown in FIG. 1 and is designated generally by reference character 100. Other embodiments of redundant coupling arrangements in accordance with the disclosure, or aspects thereof, are provided in FIGS. 2-5, as will be described. The systems and methods described herein can be used for communicating torque in rotorcraft transmissions, though the present disclosure is not limited to rotorcraft or to aircraft in general.

Referring to FIG. 1, a system 10 is shown. System 10 includes a driving member 12 connected to a driven member 14 by redundant coupling arrangement 100. Redundant coupling arrangement 100 is disposed along a rotation axis 102 and includes a first member 104 defining a first axis 20, and a second member 106 defining a second axis 22 which is operable communication with first member 104. A first torque transmitting arrangement 108 and a second torque transmitting arrangement 110 are both connected to first member 104 and second member 106.

First torque transmitting arrangement 108 is configured to transfer torque T between first member 104 and second member 106 while allowing at least one of axial displacement 16 (shown in dotted-dashed outline) between first member 104 and second member 106 and angular misalignment 18 (shown in dashed outline) of first axis 20 and relative to the second axis 22. Second torque transmitting arrangement 110 is configured to transfer torque T between first member 104 and second member 106 while allowing at least one of axial displacement 16 between first member 104 and second member 106 and angular misalignment 18 of first axis 20 and relative to the second axis 22. Dimension D shows an exemplary axial misalignment accommodated by redundant coupling arrangement 100. Angle alpha shows an exemplary angular misalignment accommodated by redundant coupling arrangement 100. As used herein, the term misalignment can mean an axial misalignment, an angular misalignment, or a combination of both axial and angular misalignment.

Torque T is communicated between first member 104 and second member 106 through a primary load path 168 (shown in FIG. 3) and/or a redundant secondary load path 170 (shown in FIG. 4), as will be described. Although described herein as a driving member 12 and a driven member 14, it is to be understood and appreciated that torque T can flow in the opposite direction through redundant coupling arrangement 100, i.e., from second member 106 to first member 104.

Figure 2:
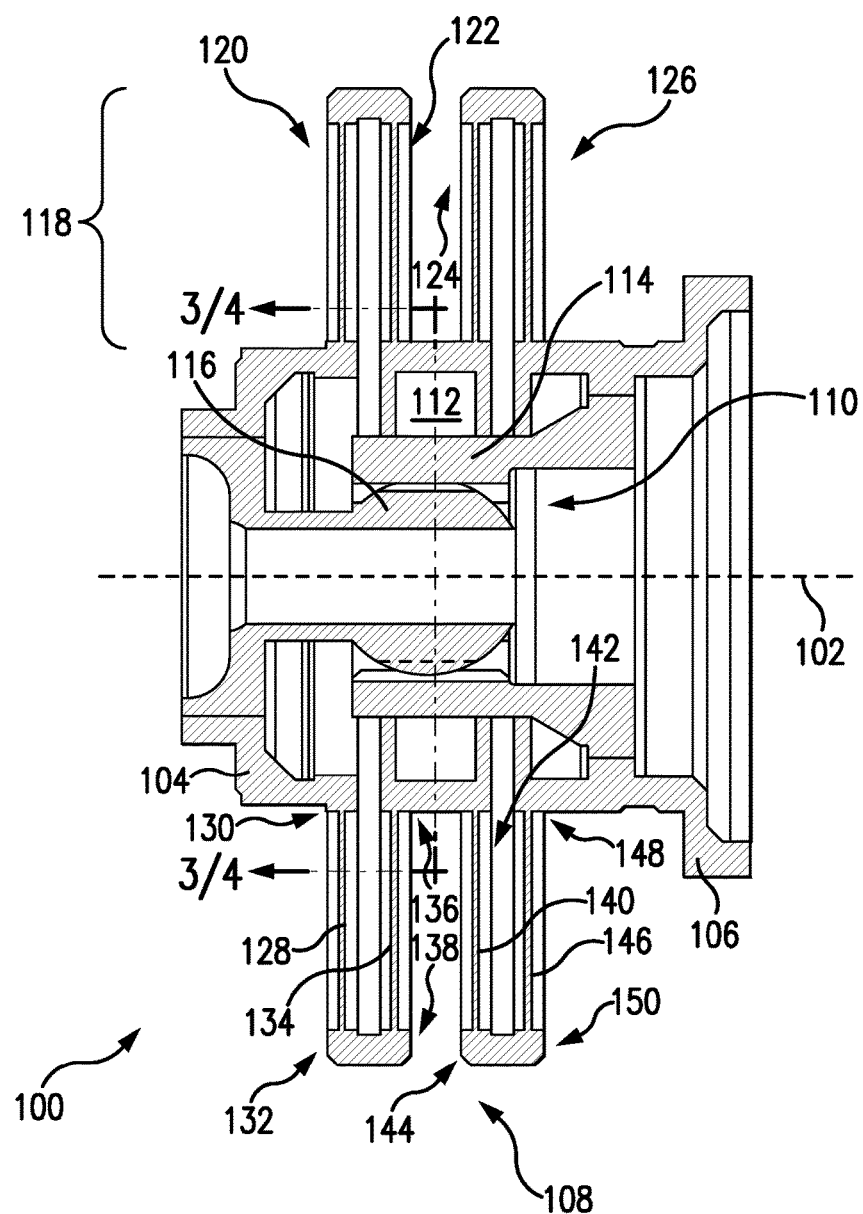
FIG. 2 is a schematic cross-sectional side view of the flexible coupling of FIG. 1, showing first and second torque transmitting arrangements of the redundant coupling arrangement.

With reference to FIG. 2, redundant coupling arrangement 100 is shown. Redundant coupling arrangement 100 includes first member 104, second member 106, first torque transmitting arrangement 108, and second torque transmitting arrangement 110. First member 104 and second member 106 are disposed axially opposite one another along rotation axis 102. First torque transmitting arrangement 108 connects first member 104 to second member 106 and has an interior 112. Second torque transmitting arrangement 110 is arranged between overlapping portions of second member 106 and first member 104 within interior 112. In the illustrated exemplary embodiment the overlapping portions include a spherical body 116, which is fixed in rotation relative to first member 104, and a collar 114, which is fixed in rotation relative to second member 106.

First torque transmitting arrangement 108 includes a flexible diaphragm section 118. Flexible diaphragm section 118 has a plurality of diaphragm members axially spaced along rotation axis 102. In the illustrated exemplary embodiment flexible diaphragm section 118 has four flexible diaphragm elements, i.e. a first diaphragm member 120, a second diaphragm member 122, a third diaphragm member 124, and a fourth diaphragm member 126. It is to be understood and appreciated that flexible diaphragm coupling 118 can have fewer than four or more than four flexible diaphragm members, as suitable for an intended application.

First diaphragm member 120 is arranged axially between first member 104 and second diaphragm member 122, has a flexible diaphragm portion 128 extending radially between an inner hub 130 and an outer rim 132, and connects to first member 104 at inner hub 130. Second diaphragm member 122, third diaphragm member 124, and fourth diaphragm member 126 are similar to first diaphragm member 120 with the difference of axial spacing and interconnection.

Second diaphragm member 122 is arranged axially between first diaphragm member 120 and third diaphragm member 124, has a flexible diaphragm portion 134 extending radially between an inner hub 136 and an outer rim 138, and connects to first diaphragm member outer rim 132 at second diaphragm outer rim 138. Third diaphragm member 124 is arranged axially between second diaphragm member 122 and fourth diaphragm member 126, has a flexible diaphragm portion 140 extending radially between an inner hub 142 and an outer rim 144, and connects to second diaphragm inner hub 136 at inner hub 142. Fourth diaphragm member 126 is arranged axially between third diaphragm member 124 and second member 106, has a flexible diaphragm portion 146 extending radially between an inner hub 148 and an outer rim 150, and connects to third diaphragm member outer rim 144 at outer rim 150. Second member 106 connects to fourth diaphragm member 126 at fourth diaphragm member inner hub 148.

The flexible diaphragm portions of the diaphragm members, e.g., flexible diaphragm portion 128, flexible diaphragm portion 134, flexible diaphragm portion 140, flexible diaphragm portion 146, are formed from a metallic material, like steel or a steel alloy. and have radially-extending profiles which vary in thickness along the respective flexible diaphragm width. The point of minimum thickness is selected to accommodate axial forces resulting from misalignment. The flexible diaphragm portions may be, for example, as described in U.S. Pat. No. 8,591,345 to Stocco et al., the contents of which are incorporated herein in its entirety by reference.

Figure 3:
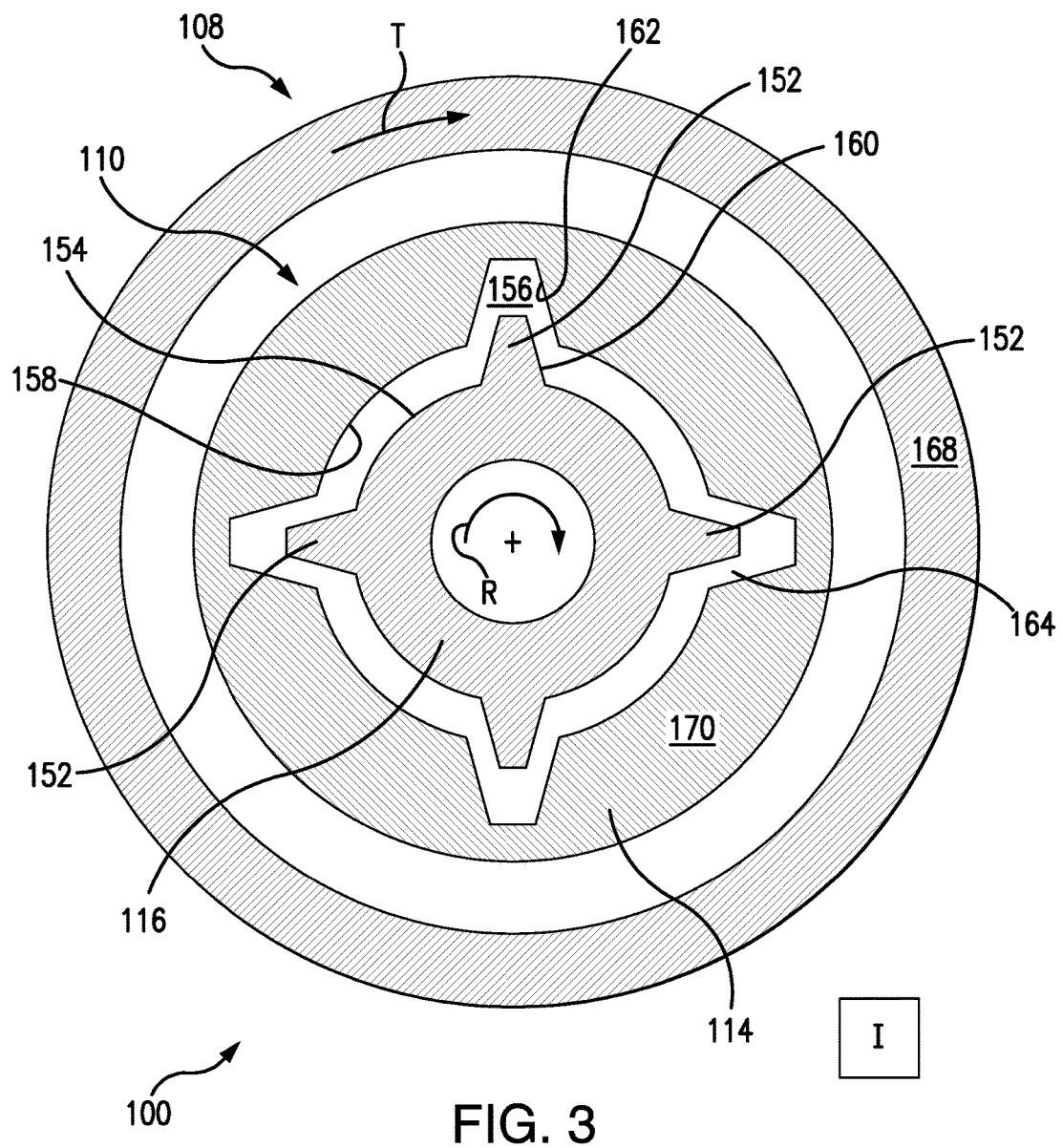
FIG. 3 is a schematic cross-sectional end view of the flexible coupling shown in FIG. 2, showing external splines of the first torque transmitting arrangement in a first position.
Figure 4:
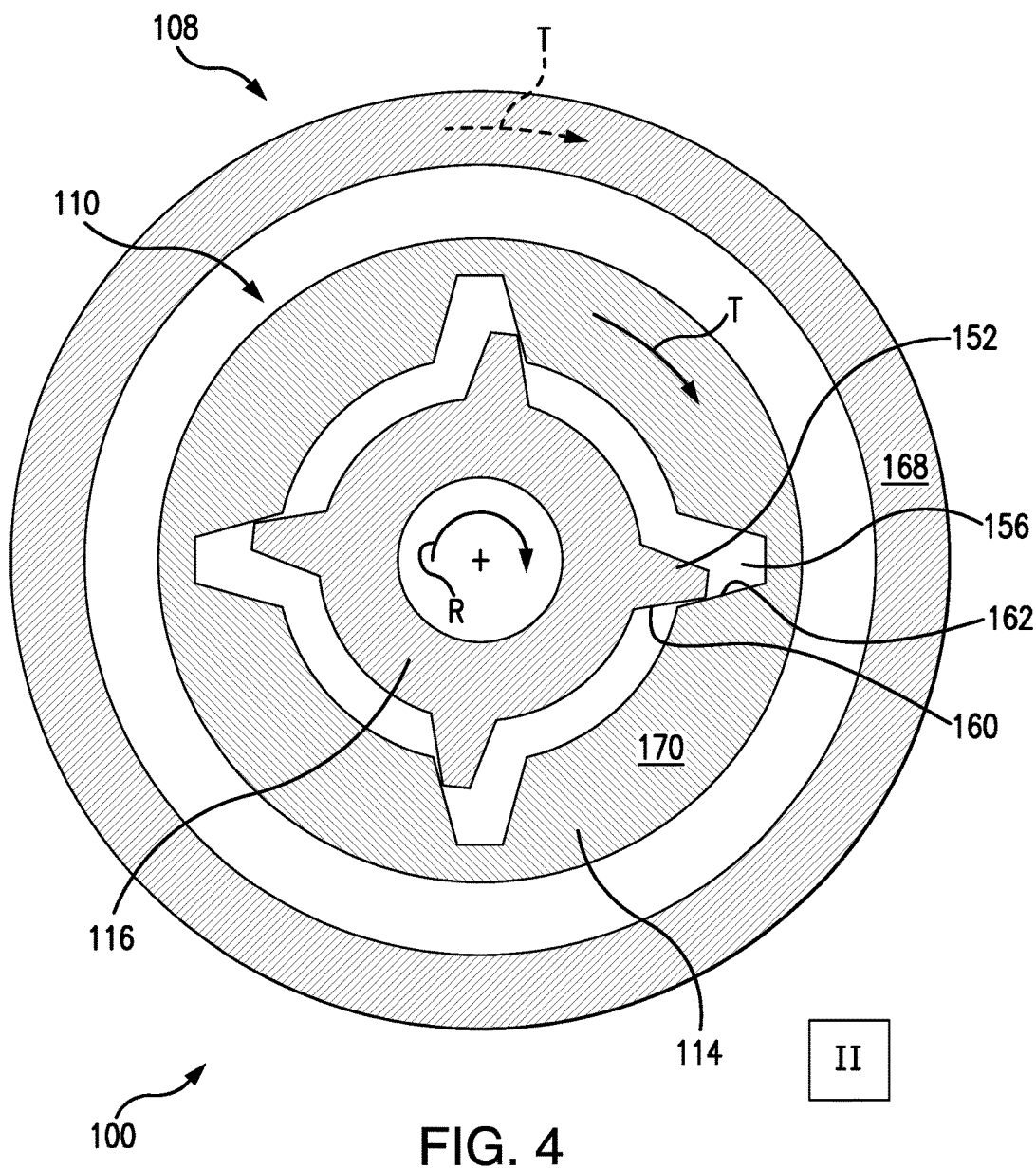
FIG. 4 is a schematic cross-sectional end view of the flexible coupling shown in FIG. 2, showing the external splines of the first torque transmitting arrangement in a second position.

Referring to FIGS. 3 and 4, redundant coupling arrangement 100 is shown. Spherical body 116 has a plurality of external splines 152 distributed circumferentially about a radially outer surface 154 of spherical body 116. Each external spline 152 is received at least partially within a respective internal spline 156, which is defined within a radially inner surface 158 of collar 114. Although four pairs of external splines 152 and internal splines 156 are shown in the illustrated exemplary embodiment, it is to be understood and appreciated that redundant coupling arrangement 100 can have a fewer than four or more than four external and internal spline pairs, as suitable for an intended application.

Each external spline 152 has a drive surface 160. The drive surfaces 160 are oriented circumferentially in the direction of rotation R of redundant coupling arrangement 100 and each oppose a respective driven face 162 of an internal spline 156. As will be appreciated by those of skill in the art in view of the present disclosure, when drive surfaces 160 contact driven faces 162 torque T communication can occur through second torque transmitting arrangement 110 via the contacting external splines 152 and internal splines 156. This allows for torque transmission through both first torque transmitting arrangement 108 and second torque transmitting arrangement 110. It also allows for torque transmission through second torque transmitting arrangement 110 only. As will also be appreciated by those of skill in the art in view of the present disclosure, when external spline 152 is separated from internal spline 154, e.g., by a gap 164, no torque communication takes place through second torque transmitting arrangement 110 via the external splines 152 and internal splines 154. This allows for torque transmission through first torque transmitting arrangement 108 and not second torque transmitting arrangement 110.

For purposes of providing selective torque communication through second torque transmitting arrangement 110 external splines 152 have a first position I (shown in FIG. 3) and a second position II (shown in FIG. 4). In the first position I, external splines 152 of spherical body 116 are disposed within respective internal splines 154 of collar 114 such that the external spline drive surfaces 160 of the external splines 152 are separated from the driven faces 162 of the internal splines 154 by a circumferential gap 164. Separation of the external spline drive surfaces 160 and the internal spline driven faces 162 prevents torque communication between spherical body 116 and collar 114. As a consequence, communication of torque T occurs exclusively through a primary load path 168 including first torque transmitting arrangement 108 when external splines 152 are in first position I; no torque communication occurs through secondary load path 170 when external splines 152 are in first position I. As will be appreciated by those of skill in the art in view of the present disclosure, separation of the external spline drive surfaces 160 and the internal spline driven faces 162 renders second torque transmitting arrangement 110 frictionless, preventing wear of internal parts disposed within redundant coupling arrangement 100, and improving reliability and/or expected service life of redundant coupling arrangement 100.

The second position II of each external spline 152 is rotationally offset from first position I relative to collar 114. The rotational offset is such that the drive surfaces 160 of the external splines 152 contact with driven faces 162 of the internal splines 156. Contact between the drive surfaces 160 of the external splines 152 and the driven faces 162 of the internal splines 156 enables torque communication of torque T through second torque transmitting arrangement 110, second torque transmitting arrangement 110 thereby providing a secondary load path 170 extending through redundant coupling arrangement 100. It is contemplated that rotation of spherical body 116 relative to collar 114 may result from, for example, application of torque T to first member 104 (shown in FIG. 1) sufficient to deform flexible diaphragm section 118 (shown in FIG. 2), second torque transmitting arrangement 110 thereby supplementing the torque-carrying capacity of first torque transmitting arrangement 108. It is also contemplated that the rotation of spherical body 116 relative to collar 114 may result from a failure of flexible diaphragm section 118, second torque transmitting arrangement 110 thereby supplanting the torque-carrying capability of first torque transmitting arrangement 108, providing redundancy. Although drive surface 160 is described herein as being oriented circumferentially in one direction of rotation R, and thus on one side only of external spline 152, it is to be understood and appreciated that drive surface 160 can alternatively be disposed on that opposite side of external spline 152 relatively the direction of rotation shown. It is also to be understood and appreciated that drive surface 160 can be disposed within internal spline 152 to engage a drive face of external spline 152 for communicating torque from collar 114 to spherical body 116.

As described, torque can be transmitted through redundant coupling arrangement 100 according to three operating modes. In a first operating mode, all torque T is transmitted through the first torque transmitting arrangement 108 along primary load path 168 and there is zero contact in second torque transmitting arrangement 110 along the secondary load path 170. In a second operating mode, all torque T is transmitted through second torque transmitting arrangement 110 via secondary load path 170 in case of failure of first torque transmitting arrangement 108. In a third operating mode, torque T is split between first torque transmitting arrangement 108 and second torque transmitting arrangement 110, first torque transmitting arrangement 108 being primary torque transmission mechanism along primary load path 168 and the second torque transmitting arrangement 110 providing overload protection by engaging (via contact) after a predetermined amount of torque has been applied to the redundant coupling arrangement for torque transmission along secondary load path 170.

Figure 5A:
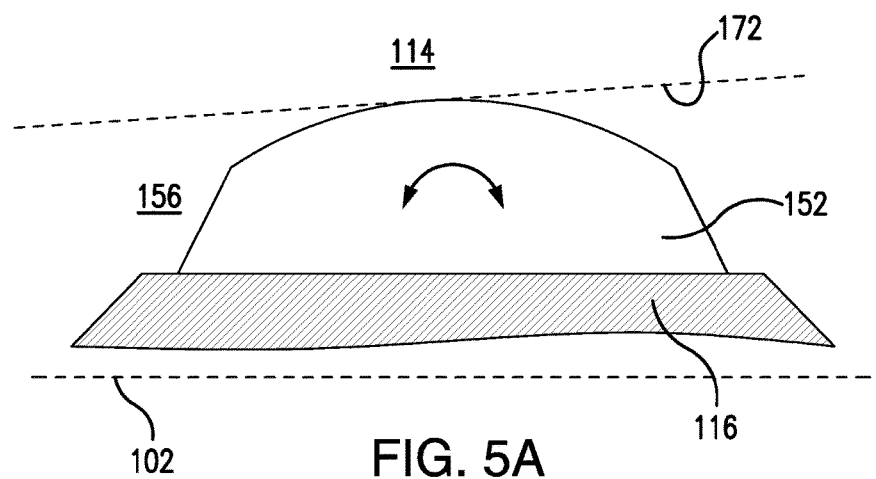
FIGS. 5A and 5B are schematic views of the redundant coupling arrangement, showing an internal spline with planar contact faces and an external spline with a spherical drive surface and an arcuate profile, according to embodiments.

With reference to FIG. 5A, external spline 152 and internal spline 156 are shown. In the illustrated exemplary embodiment external spline 152 has a crown 172. Crown 172 is defined on a radially outer surface of external spline 152, extends axially along rotation axis 102, and defines a convex surface about which collar 114 (shown in FIG. 3) may pivot or rock. The convex surface defined by crown 172 allows external spline 152 to slidingly contact a radially inner driven face 162 of internal spline 156 to accommodate misalignment while transferring torque T (shown in FIG. 4) through second torque transmitting arrangement 110.

Figure 5B:
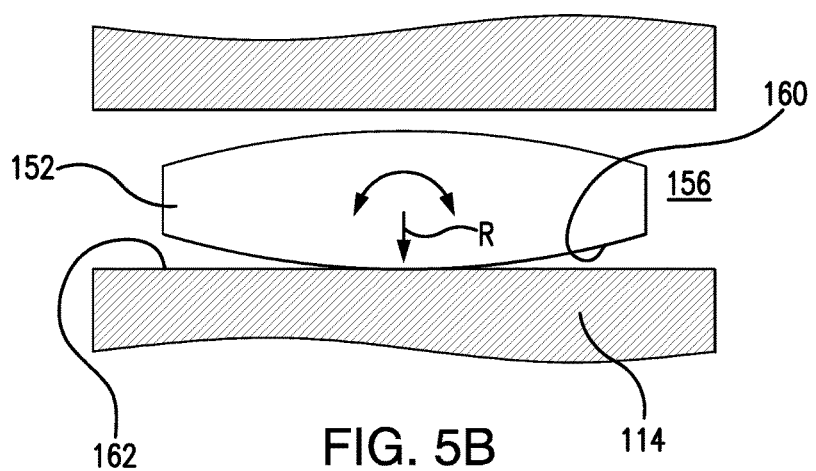

With reference to FIG. 5B, external spline 152 and internal spline 154 are shown. In the illustrated exemplary embodiment external spline 152 has a spherical drive surface 160, thereby forming a spherical external spline. Spherical drive surface 160 has a convex profile in a circumferential direction opposing driven face 162 of internal spline 156, which is substantially planar. The convex profile of spherical drive surface 160 of external spline 152 allows external spline 152 to rock against driven face 162 of internal spline 156 when in second position II (shown in FIG. 4), enabling first torque transmitting arrangement 108 to accommodate misalignment while communicating torque T (shown in FIG. 4) between contacting drive surface 160 and driven face 162. It is to be understood and appreciated that external spline can have a single spherical drive surface 162, spherical drive surfaces 162 arranged on circumferentially opposite sides of external spline 152, and/or a crown 172, as suitable for a given application.

Conventional flexible couplings generally provide a single load path through the flexible coupling. This is generally advantageous as the single load path reduces (or eliminates entirely) contacting surfaces within the flexible coupling, which can wear over time due to relative movement between the contacting surfaces, and could otherwise require periodic inspection and or replacement.

In embodiments described herein, redundant coupling arrangements are provided which have both primary and second load paths. In particular, first torque transmitting arrangement 108 provides a primary load path through redundant coupling arrangement 100 and second torque transmitting arrangement 110 provides a secondary load path through redundant coupling arrangement 100. Wear from contacting surfaces associated with the secondary load path is reduced (or effectively eliminated) by limiting contact between torque transmitting parts of second torque transmitting arrangement 110 to service intervals when torque applied to redundant coupling arrangement 100 exceeds the torque-carrying capacity (or capability) of first torque transmitting arrangement 108. In particular, torque communication occurs only when relative rotation of spherical body 116 relative to collar 114 is sufficient to bring drive surfaces 160 of external splines 152 into contact with driven faces 162 of internal splines 156, such as when sufficient torque is applied to deform or fail flexible diaphragm section 118. This provides redundancy, as torque communication can continue through second torque transmitting arrangement 110 under either circumstance.

The methods and systems of the present disclosure, as described above and shown in the drawings, provide for flexible couplings with superior properties including a contactless secondary load path that engages upon relative rotation between input and second members connected by the flexible coupling. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A redundant coupling arrangement, comprising:
a first member defining a first axis;
a second member defining a second axis being in operable communication with the first member;
a first torque transmitting arrangement configured to transfer torque between the first member and the second member while allowing at least one of axial displacement between the first member and the second member and angular misalignment of the first axis relative to the second axis; and
a second torque transmitting arrangement configured to transfer torque between the first member and the second member while allowing at least one of axial displacement between the first member and the second member and angular misalignment of the first axis relative to the second axis,
wherein the second torque transmitting arrangement includes a spherical body disposed within a collar, wherein the collar is fixed in rotation relative to one of the first member and the second member, wherein the spherical body is fixed relative to the other of the first member and the second member;
wherein the spherical body has a plurality of external splines distributed circumferentially about a radially outer surface of the spherical body; and
wherein the flexible coupling arrangement has a first operating mode, wherein all torque is transmitted through the first torque transmitting arrangement and there is zero contact in the second torque transmitting arrangement;
a second operating mode, wherein all torque is transmitted through the second torque transmitting arrangement in case of failure of the first torque transmitting arrangement; and
a third operating mode, wherein torque is split between the first torque transmitting arrangement and the second torque transmitting arrangement, the first torque transmitting arrangement being the primary torque transmission mechanism and the second torque transmitting arrangement providing overload protection by engaging (via contact) after a predetermined amount of torque has been applied to the redundant coupling arrangement.
2. The arrangement as recited in claim 1, wherein the first torque transmitting arrangement and the second torque transmitting arrangement allow both axial displacement between the first member and the second member and angular misalignment of the first axis relative to the second axis.

3. The arrangement as recited in claim 1, wherein the second torque transmitting arrangement is positioned radially inward relative to the first torque transmitting arrangement.

4. The arrangement as recited in claim 1, wherein the first torque transmitting arrangement includes a flexible diaphragm section with an interior, wherein the second torque transmitting arrangement is disposed within the interior of the first torque transmitting arrangement.

5. The arrangement as recited in claim 4, wherein the flexible diaphragm section includes a pair of axially adjacent diaphragm members coupled at outer rim portions.

6. The arrangement as recited in claim 4, wherein the flexible diaphragm section includes a pair of axially adjacent diaphragm members coupled at inner rim portions.

7. The arrangement as recited in claim 1, wherein the collar has a plurality of internal splines distributed circumferentially about a radially inner surface of the collar.

8. A redundant coupling arrangement, comprising:
a first member defining a first axis;
a second member defining a second axis being in operable communication with the first member;
a first torque transmitting arrangement configured to transfer torque between the first member and the second member while allowing at least one of axial displacement between the first member and the second member and angular misalignment of the first axis relative to the second axis; and
a second torque transmitting arrangement configured to transfer torque between the first member and the second member while allowing at least one of axial displacement between the first member and the second member and angular misalignment of the first axis relative to the second axis,
wherein the second torque transmitting arrangement includes a spherical body disposed within a collar, wherein the collar is fixed in rotation relative to one of the first member and the second member, wherein the spherical body is fixed relative to the other of the first member and the second member;
wherein the spherical body has a plurality of external splines distributed circumferentially about a radially outer surface of the spherical body, wherein the plurality of external splines are received within respective internal splines, and wherein the internal splines have planar surfaces, wherein the external splines have an arcuate profile and a spherical drive surface.

9. A redundant coupling arrangement, comprising:
a first member defining a first axis;
a second member defining a second axis being in operable communication with the first member;
a first torque transmitting arrangement configured to transfer torque between the first member and the second member while allowing at least one of axial displacement between the first member and the second member and angular misalignment of the first axis relative to the second axis; and
a second torque transmitting arrangement configured to transfer torque between the first member and the second member while allowing at least one of axial displacement between the first member and the second member and angular misalignment of the first axis relative to the second axis,
wherein the second torque transmitting arrangement includes a spherical body disposed within a collar, wherein the collar is fixed in rotation relative to one of the first member and the second member, wherein the spherical body is fixed relative to the other of the first member and the second member;
wherein the spherical body has a plurality of external splines distributed circumferentially about a radially outer surface of the spherical body, wherein the plurality of external splines are received within respective internal splines, and wherein the external splines have a first position and a second position, surfaces of the external splines being separated from faces of the internal splines in the first position, the surfaces of the external splines contacting faces of the internal splines the second position.

10. A system, comprising:
a first member defining a first axis;
a second member defining a second axis being in operable communication with the first member;
a first torque transmitting arrangement configured to transfer torque between the first member and the second member while allowing at least one of axial displacement between the first member and the second member and angular misalignment of the first axis relative to the second axis; and
a second torque transmitting arrangement configured to transfer torque between the first member and the second member while allowing at least one of axial displacement between the first member and the second member and angular misalignment of the first axis relative to the second axis,
wherein the second torque transmitting arrangement includes a spherical body disposed within a collar, wherein the collar is fixed in rotation relative to one of the first member and the second member, wherein the spherical body is fixed relative to the other of the first member and the second member;
wherein the spherical body has a plurality of external splines distributed circumferentially about a radially outer surface of the spherical body;
a driving member connected to the first member; and
a driven member connected to the second member, wherein the second torque transmitting arrangement has a first configuration and a second configuration, no torque being communicated through the second torque transmitting arrangement in the first configuration, torque being communicated through the second torque transmitting arrangement in the second configuration.

11. A method of redundantly communicating torque through a transmission, comprising:
receiving torque at a first member defining a first axis; and
communicating the torque to a second member defining a second axis and operably connected to the first member by a first torque transmitting arrangement and a second torque transmitting arrangement while allowing at least one of axial displacement between the first member and the second member and angular displacement of the first axis relative to the second axis,
wherein the second torque transmitting arrangement includes a spherical body disposed within a collar, wherein the collar is fixed in rotation relative to one of the first member and the second member, wherein the spherical body is fixed relative to the other of the first member and the second member, and
wherein the spherical body has a plurality of external splines distributed circumferentially about a radially outer surface of the spherical body, wherein the torque is initially transmitted through the first torque transmitting arrangement and not the second torque transmitting arrangement, and thereafter is transmitted through both the first and second torque transmitting arrangements.

* * * * *